United States Patent
Gavrilovic et al.

(10) Patent No.: US 6,594,071 B1
(45) Date of Patent: Jul. 15, 2003

(54) METHOD AND APPARATUS FOR AMPLIFIER CONTROL

(75) Inventors: Pavle Gavrilovic, Allen, TX (US); Peter J. Goudreau, Garland, TX (US); James E. Newby, McKinney, TX (US); Ricardo E. Saad, Plano, TX (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 09/970,055

(22) Filed: Oct. 2, 2001

(51) Int. Cl.[7] ................................................. H01S 3/00
(52) U.S. Cl. ............................... 359/341.4; 359/341.41
(58) Field of Search ........................ 359/341.4, 341.41

(56) References Cited

U.S. PATENT DOCUMENTS

| | | | |
|---|---|---|---|
| 4,700,339 A | 10/1987 | Gordon et al. | 370/3 |
| 4,932,739 A | 6/1990 | Islam | 350/96.15 |
| 4,995,690 A | 2/1991 | Islam | 350/96.15 |
| 5,020,050 A | 5/1991 | Islam | 370/4 |
| 5,060,302 A | 10/1991 | Grimes | 359/135 |
| 5,078,464 A | 1/1992 | Islam | 385/122 |
| 5,101,456 A | 3/1992 | Islam | 385/27 |
| 5,115,488 A | 5/1992 | Islam et al. | 385/129 |
| 5,117,196 A | 5/1992 | Epworth et al. | 359/333 |
| 5,140,456 A | 8/1992 | Huber | 359/341 |
| 5,224,194 A | 6/1993 | Islam | 385/122 |
| 5,225,922 A | 7/1993 | Chraplyvy et al. | 359/124 |
| 5,271,024 A | 12/1993 | Huber | 372/6 |
| 5,369,519 A | 11/1994 | Islam | 359/173 |
| 5,485,536 A | 1/1996 | Islam | 385/31 |
| 5,557,442 A | 9/1996 | Huber | 359/179 |
| 5,623,508 A | 4/1997 | Grubb et al. | 372/3 |
| 5,633,750 A | 5/1997 | Nogiwa et al. | 359/341 |
| 5,664,036 A | 9/1997 | Islam | 385/31 |
| 5,673,280 A | 9/1997 | Grubb et al. | 372/3 |
| 5,778,014 A | 7/1998 | Islam | 372/6 |

(List continued on next page.)

FOREIGN PATENT DOCUMENTS

| | | | |
|---|---|---|---|
| EP | 0 829 980 A2 | 3/1998 | H04J/14/02 |
| EP | 0 903 876 B1 | 3/1999 | H04B/10/17 |
| EP | 0 903 876 A1 | 3/1999 | H04B/10/17 |
| EP | 0 911 926 A1 | 4/1999 | H01S/3/10 |
| EP | 0 959 578 A2 | 11/1999 | H04J/14/02 |
| EP | 1 054 489 | 11/2000 | H01S/3/067 |

(List continued on next page.)

OTHER PUBLICATIONS

Chraplyvy et al., "Equalization in Amplified WDM Lightwave Transmission Systems," IEEE Photonics Technology Letters, vol. 4, No. 8, pp. 920–922., Aug. 1992.

Liaw et al., "Passive Gain–Equalized Wide–Band Erbium–Doped Fiber Amplifier Using Samarium–Doped Fiber," IEEE Photonics Technology Letters, vol. 8, No. 7, pp. 870–881., Jul. 7, 1996.

Tonguz et al., "Gain Equalization of EDFA Cascades," Journal of Lightwave Technology, vol. 15, No. 10, pp. 1832–1841, Oct. 1997.

(List continued on next page.)

*Primary Examiner*—Mark Hellner
(74) *Attorney, Agent, or Firm*—Baker Botts L.L.P.

(57) ABSTRACT

In one aspect of the invention, a control system for use in an optical amplifier includes a plurality of control legs, each operable to receive one of plurality of portions of an optical signal, wherein each of the plurality of portions comprises a different percentage of the optical signal. The system further includes a plurality of registers, each associated with one of the control legs and each operable to store a value proportional to the portion of the optical signal communicated in the associated control leg. The system also includes a controller operable to select one of the values stored in one of the plurality of registers and to scale that value by a scaling factor to generate a scaled value, wherein the scaling factor is determined at least in part by the percentage of the optical signal associated with that value. The controller is operable to generate, based at least in part on the scaled value, a control signal operable to affect the gain of the amplifier.

50 Claims, 4 Drawing Sheets

U.S. PATENT DOCUMENTS

| | | |
|---|---|---|
| 5,790,289 A | 8/1998 | Taga et al. .................. 359/124 |
| 5,796,909 A | 8/1998 | Islam ......................... 385/147 |
| 5,801,860 A | 9/1998 | Yoneyama .................. 359/124 |
| 5,852,510 A | 12/1998 | Meli et al. .................. 359/341 |
| 5,861,981 A | 1/1999 | Jabr ........................... 359/341 |
| 5,887,093 A | 3/1999 | Hansen et al. ............... 385/27 |
| 5,907,429 A * | 5/1999 | Sugata ........................ 359/341 |
| 5,920,423 A | 7/1999 | Grubb et al. ............... 359/341 |
| 5,959,766 A | 9/1999 | Otterbach et al. .......... 359/337 |
| 5,995,275 A | 11/1999 | Sugaya ....................... 359/341 |
| 6,008,933 A | 12/1999 | Grubb et al. ............... 359/341 |
| 6,040,933 A | 3/2000 | Khaleghi et al. ........... 359/124 |
| 6,043,927 A | 3/2000 | Islam ......................... 359/332 |
| 6,049,413 A | 4/2000 | Taylor et al. ............... 359/337 |
| 6,052,393 A | 4/2000 | Islam ............................ 372/6 |
| 6,055,092 A | 4/2000 | Sugaya et al. .............. 350/337 |
| 6,061,173 A * | 5/2000 | Yamane et al. ............. 359/345 |
| 6,064,501 A | 5/2000 | Roberts et al. ............. 359/110 |
| 6,067,177 A | 5/2000 | Kanazawa .................. 359/124 |
| 6,072,601 A | 6/2000 | Toyohara .................... 358/484 |
| 6,088,152 A | 7/2000 | Berger et al. ............... 359/334 |
| 6,094,296 A | 7/2000 | Kosaka ....................... 359/341 |
| 6,101,024 A | 8/2000 | Islam et al. ................. 359/334 |
| 6,104,848 A | 8/2000 | Toyohara et al. ............. 385/24 |
| 6,115,157 A | 9/2000 | Barnard et al. ............. 359/124 |
| 6,115,174 A | 9/2000 | Grubb et al. ............... 359/334 |
| 6,134,034 A | 10/2000 | Terahara ..................... 359/124 |
| 6,147,794 A | 11/2000 | Stentz ........................ 359/334 |
| 6,151,160 A | 11/2000 | Ma et al. .................... 359/341 |
| 6,172,803 B1 | 1/2001 | Masuda et al. ............. 359/341 |
| 6,185,022 B1 | 2/2001 | Harasawa ................... 359/124 |
| 6,219,162 B1 | 4/2001 | Barnard et al. ............. 359/124 |
| 6,229,937 B1 | 5/2001 | Nolan et al. .................. 385/24 |
| 6,239,902 B1 | 5/2001 | Islam et al. ................. 359/334 |
| 6,239,903 B1 | 5/2001 | Islam et al. ................. 359/337 |
| 6,271,945 B1 | 8/2001 | Terahara ..................... 359/124 |
| 6,282,002 B1 | 8/2001 | Grubb et al. ............... 359/160 |
| 6,320,884 B1 | 11/2001 | Kerfoot, III et al. ............ 372/3 |
| 6,335,820 B1 | 1/2002 | Islam ......................... 359/334 |
| 6,341,034 B1 | 1/2002 | Sun et al. ............... 359/341.41 |
| 6,344,922 B1 | 2/2002 | Grubb et al. ............... 359/334 |
| 6,356,383 B1 | 3/2002 | Cornwell, Jr. et al. ...... 359/334 |
| 6,356,384 B1 | 3/2002 | Islam ......................... 359/334 |
| 6,359,725 B1 | 3/2002 | Islam ......................... 359/334 |
| 6,370,164 B1 | 4/2002 | Islam ............................ 372/6 |
| 6,374,006 B1 | 4/2002 | Islam et al. ................... 385/15 |
| 6,381,391 B1 | 4/2002 | Islam et al. ................. 385/123 |
| 6,388,801 B1 | 5/2002 | Sugaya et al. .............. 359/334 |
| 6,396,625 B1 | 5/2002 | Nakaji .................... 359/341.41 |
| 6,404,523 B1 | 6/2002 | Morikawa et al. .......... 359/124 |
| 6,417,959 B1 | 7/2002 | Bolshtyansky et al. ..... 359/334 |
| 6,417,965 B1 * | 7/2002 | Ye et al. ................. 359/341.41 |
| 6,483,630 B2 * | 11/2002 | Kosaka .................. 359/337.11 |
| 2001/0014194 A1 | 8/2001 | Sasaoka et al. ............... 385/15 |
| 2001/0050802 A1 | 12/2001 | Namiki et al. ......... 359/337.11 |
| 2002/0048062 A1 | 4/2002 | Sakamoto et al. .......... 359/124 |
| 2002/0060821 A1 | 5/2002 | Manna et al. ............... 359/124 |

FOREIGN PATENT DOCUMENTS

| | | | |
|---|---|---|---|
| JP | 07202304006 | * 8/1995 | |
| WO | 98/20587 | 5/1998 | ............. H01S/3/30 |
| WO | 98/36479 | 8/1998 | ............. H01S/3/10 |
| WO | 98/42088 | 9/1998 | ........... H04B/10/17 |
| WO | 99/43117 | 8/1999 | ............ H04J/14/00 |
| WO | 99/66607 | 12/1999 | |
| WO | 00/49721 | 8/2000 | |
| WO | 00/72479 | 11/2000 | ........... H04B/10/08 |
| WO | 00/73826 A2 | 12/2000 | ............ G02B/6/00 |

OTHER PUBLICATIONS

White et al.; "Optical Fiber Components and Devices," Optical Fiber Telecommunications, Ch. 7, pp. 266–319, 1997.

Agrawal, "Fiber–Optic Communication Systems," Second Edition, Basic Concepts, 2nd Ed. John Wiley & Sons, pp. 365–366 plus title page and copyright page, 1997.

Masuda et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998.

Ma et al., "240–km Repeater Spacing in a 5280–km WDM System Experiment Using 8 x 2.5 Gb/s NRZ Transmission," IEEE Photonics Technology Letters, vol. 10, No. 6, pp. 893–895, Jun. 1998.

Forghieri et al., "Simple Model of Optical Amplifier Chains to Evaluate Penalties in WDM Systems," Journal of Lightwave Technology, vol. 16, No. 9, pp. 1570–1576, Sep. 1998.

Chernikov et al., "Broadband Silica Fibre Raman Amplifiers at 1.3 $\mu$m," ECOC, pp. 49–50, Sep. 20–24, 1998.

Letelier et al., "Access to Transmission Performance Margins Through Pre–emphasis Adjustment in WDM Systems," ECOC, pp. 275–276, Sep. 20–24, 1998.

Chernikov et al., "Broadband Raman amplifiers in the spectral range of 1480–1620nm," OFC/IOOC Technical Digest, vol. 2, pp. 117–119, Feb. 21–26, 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Kawai et al. "Wide–Bandwidth and long–distance WDM Transmission Using Highly Gain–Flattened Hybrid Amplifier," IEEE Photonics Technology Letters, vol. 11, No. 7, pp. 886–888, Jul. 1999.

Lewis et al., "Gain and saturation characteristics of dual–wavelength–pumped silica fibre Raman amlifiers," Electronics Letters, vol. 35, No. 14, pp. 1178–1179, Jul. 8, 1999.

Suzuki et al., "50 GHz spaced, 32 x 10 Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 8, 1999.

Emori et al., "100nm, bandwidth flat–gain Raman amplifiers pumped and gain–equalised by 12–wavelength–channel WDM laser diode unit," Electronics Letters, vol. 35, No. 16, pp. 1355–1356, Aug. 5, 1999.

Manna et al., "Modeling of Penalties on Chains of Optical Amplifiers with Equalizing Filters," Journal of Lightwave Technology, vol. 18, No. 3, pp. 295–300, Mar. 2000.

Fludger et al., "Fundamental Noise Limits in Broadband Raman Amplifiers," OFC, pp. MA5/1–MA5/3, 2001.

Seo et al., "Compensation of Raman–Induced Crosstalk Using a Lumped Germanosilicate Fiber Raman Amplifier in the 1.571–1.591–$\mu$m Region," IEEE Photonics Technology Letters, vol. 13, No. 1, pp. 28–30, Jan. 2001.

Seo et al., "Simultaneous Amplification and Channel Equalization Using Raman Amplifier for 30 Channels in 1.3–$\mu$m Band," Journal of Lightwave Technology, vol. 19, No. 3, pp. 391–397.

Chen et al., "Transient effects in saturated Raman amplifiers," Electronics Letters, vol. 37, No. 6, 2 pgs., Mar. 15, 2001.

Optical Society of America, Optical Amplifiers and Their Applications, Technical Digest, entitled "Raman amplification and dispersion–managed solitons for all–optical, ultra–long–haul, dense WDM," with copy of slides presented at OSA, Stress, Italy attached, Jul. 1–4, 2001.

Menif et al., "Application of Preemphasis to Achieve Flat Output OSNR in Time–varying Channels in Cascaded EDFAs Without Equalization," Journal of Lightwave Technology, vol. 19, No. 10, pp. 1440–1452, Oct. 2001.

Murakami et al., "WDM Upgrading of an Installed Submarine Optical Amplifier System," Journal of Lightwave Technology, vol. 19, No. 11, pp. 1665–1674, Nov. 2001.

Scheerer et al., "SRS Crosstalk in Preemphasized WDM Systems," pp. WM28–1/293–WM28–3/295.

Emori et al., "Cost–effective depolarized diode pump unit designed for C–band flat–gain Raman amplifiers to control EDFA gain profile," FF4–1–3, pp. 106–108.

Koch et al., "Broadband gain flattened Raman Amplifier to extend operation in the third telecommunication window," FF3–1–3, pp. 103–105.

Emori et al., "Less than 4.7 dB Noise Figure Broadband In–line EDFA with a Raman Amplified–1300 ps/nm DCF Pumped by Multi–channel WDM Laser Diodes," paper PD3–1–5.

Srivastava et al., "High–speed WDM Transmission in All-Wave™ Fiber in Both the 1.4–$\mu$m and 1.55–$\mu$m Bands," paper PD–2–5, Vail, CO.

Masuda et al., "76–nm 3–dB gain–band hybrid fiber amplifier without gain–equalizer," (Submitted to Post–Deadline Paper OAA'98), pp. PD7–1—PD7–5.

Rottwitt et al., "A 92 nm Bandwidth Raman Amplifier," OSA Optical Fiber Conference, San Jose, CA, paper PD–6, pp. 1–4.

Pending Patent Application; USSN 09/971,436; entitled "High Reliability Optical Amplification," by Mohammed N. Islam et al., filed Oct. 5, 2001.

Pending Patent Application; USSN 10/188,158; entitled "Gain Control in Nonlinear Fiber Amplifier Stages," by Mohammed N. Islam, filed Jul. 1, 2002.

Pending Patent Application; USSN 10/188, 007; entitled "Multiple Wavelength Pumping of Raman Amplifier Stages," by Mohammed N. Islam, filed Jul. 1, 2002.

* cited by examiner

US 6,594,071 B1

METHOD AND APPARATUS FOR AMPLIFIER CONTROL

TECHNICAL FIELD OF THE INVENTION

The present invention relates generally to the field of optical communication systems, and more particularly to a method and apparatus for controlling an optical amplifier.

BACKGROUND

When utilizing optical amplifiers, in various circumstances it is desirable to control various aspects of the amplifier, such as the gain of the amplifier. For example, it may be desirable to control amplifier gain to provide an approximately stable output level despite changes in pump laser power due to, for example, pump laser aging or fiber plant losses.

Two common approaches to controlling amplifier gain are the use of logarithmic amplifiers and the use of electronic range switching. Economically acceptable implementations of these approaches typically suffer from low linearity and accuracy over all or a part of the bandwidth being amplified. In addition, these approaches typically involve a significant trade-off between bandwidth and accuracy. Generally, as bandwidth increases in these approaches, the errors associated with these approaches also increase. In addition, economically feasible implementations of these conventional approaches typically have quite limited dynamic range.

Overview

The present invention recognizes a need for a method and apparatus operable to facilitate economical amplifier gain control with increased total dynamic range. Various implementations of the present invention reduce or eliminate at least some of the shortcomings of conventional amplifier control approaches.

In one aspect of the invention, a control system for use in an optical amplifier comprises a plurality of control legs, each operable to receive one of plurality of portions of an optical signal, wherein each of the plurality of portions comprises a different percentage of the optical signal. The system further comprises a plurality of registers, each associated with one of the control legs and each operable to store a value proportional to the portion of the optical signal communicated in the associated control leg. The system also comprises a controller operable to select one of the values stored in one of the plurality of registers and to scale that value by a scaling factor to generate a scaled value, wherein the scaling factor is determined at least in part by the percentage of the optical signal associated with that value. The controller is operable to generate, based at least in part on the scaled value, a control signal operable to affect the gain of the amplifier.

In another aspect of the invention, a control system for use in an optical amplifier comprises a first optical tap operable to separate an optical signal into a primary portion comprising a first percentage of the optical signal, and a secondary portion comprising a second percentage smaller than the first percentage of the optical signal. The system also comprises a second optical tap operable to separate the secondary portion into a first control portion comprising a first percentage of the secondary portion and a second control portion comprising a second percentage smaller than the first percentage of the secondary portion. The system further includes a plurality of registers each associated with one of the control portions and each operable to store a measured value proportional to a power of the optical signal if the measured value is between a maximum value and a minimum value associated with that register. The system also comprises a controller operable to identify a register storing a measured value and to determine based at least in part on the measured value a control signal operable to affect the gain of the amplifier.

In still another aspect of the invention, a control system for use in an optical amplifier, comprises an optical tap operable to receive a feedback portion of an optical signal being amplified, to communicate a first percentage of the feedback signal to a first control leg, and to communicate a second percentage of the feedback signal smaller than the first percentage of the feedback signal to a second control leg. The system further comprises a first register operable to store a measured value of a portion of the optical signal obtained from the first control leg if the measured value does not overflow or underflow the first register, and a second register operable to store a measured value of a portion of the optical signal obtained from the second control leg if the measured value does not overflow or underflow the second register. The system still further comprises a controller operable to identify a register storing a measured value and to scale the measured value differently depending on which register stores the measured value. The controller is further operable to generate based at least in part on the scaled measured value a control signal operable to affect the gain of the amplifier.

In yet another aspect of the invention, a method of operating an optical amplifier comprises receiving a feedback portion of an optical signal and separating the feedback portion into a plurality of control portions, each comprising a different percentage of the optical signal. The method also comprises, for each control portion, storing in a register associated with that control portion a value proportional to that control portion, and selecting a register to be used to generate a control signal. The method also comprises scaling the value stored in the selected register based at least in part on the percentage of the optical signal associated with selected value, and generating the control signal based at least in part on the scaled value, wherein the control signal is operable to affect the gain of the amplifier.

Depending on the specific features implemented, particular embodiments of the present invention may exhibit some, none, or all of the following technical advantages. For example, various embodiments of the invention facilitate utilizing partitioned control circuitry to achieve high dynamic range while utilizing simple, inexpensive components that help to minimize system cost and maintain good system speed and accuracy.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
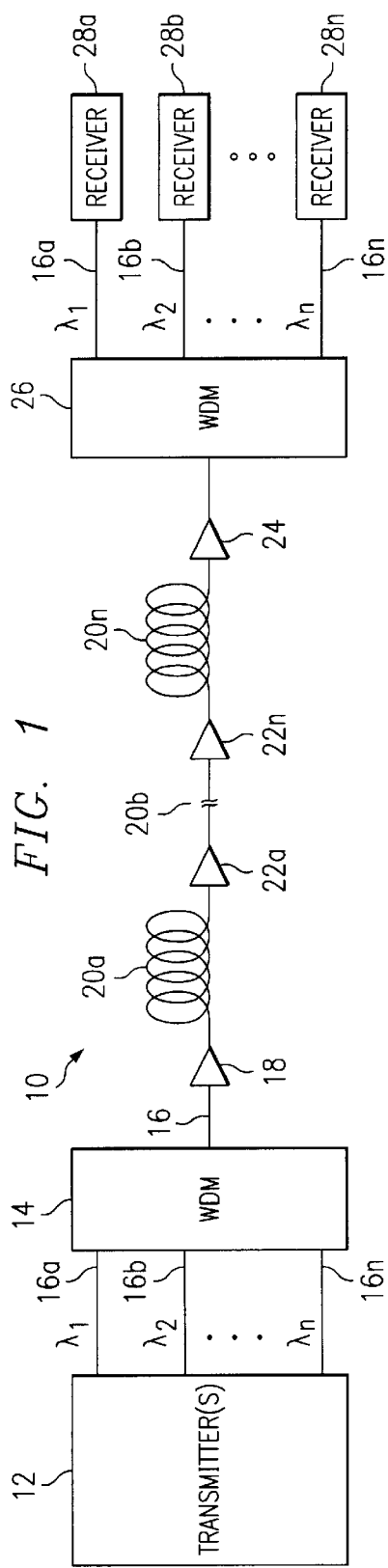
FIG. 1 is a block diagram showing an exemplary optical communication system constructed according to the teachings of the present invention.

FIG. 1 is a block diagram showing an exemplary optical communication system 10 operable to facilitate communication of one or more optical signals. System 10 includes a transmitter bank 12 operable to generate a plurality of wavelength signals 16a–16n. Each wavelength signal 16a–16n comprises at least one wavelength or range of wavelengths of light substantially different from wavelengths carried by other signals 16.

Transmitter bank 12 may include, for example, one or more optical transmitters operable to generate alone or in combination a plurality of wavelength signals 16. In one embodiment, each one of the plurality of transmitters is operable to generate one optical signal having at least one wavelength that is distinct from wavelengths generated by other transmitters 12. Alternatively, a single transmitter 12 operable to generate a plurality of wavelength signals could be implemented.

System 10 also includes a combiner 14 operable to receive multiple signal wavelengths 16a–16n and to combine those signal wavelengths into a single multiple wavelength signal 16. As one particular example, combiner 14 could comprise a wavelength division multiplexer (WDM). The term wavelength division multiplexer as used herein may include conventional wavelength division multiplexers or dense wavelength division multiplexers.

In some embodiments, system 10 may include a booster amplifier 18 operable to receive and amplify wavelengths of signal 16a prior to communication over a transmission medium 20. Transmission medium 20 can comprise multiple spans 20a–20n of fiber. As particular examples, fiber spans 20 could comprise standard single mode fiber (SMF), dispersion-shifted fiber (DSF), non-zero dispersion-shifted fiber (NZDSF), or other fiber type or combinations of fiber types.

Where communication system 10 includes a plurality of fiber spans 20a–20n, system 10 can include one or more in-line amplifiers 22a–22m. In-line amplifiers 22 reside between fiber spans 20 and operate to amplify signal 16 as it traverses fiber 20.

Optical communication system 10 can also include a preamplifier 24 operable to receive signal 16 from a final fiber span 20n and to amplify signal 16 prior to passing that signal to a separator 26. Separator 26 may comprise, for example, a wavelength division demultiplexer (WDM), which can operate on wavelength division multiplexed signals or dense wavelength division multiplexed signals. Separator 26 operates to separate individual wavelength signals 16a–16n from multiple wavelength signal 16. Separator 26 can communicate individual signal wavelengths or ranges of wavelengths 16a–16n to a bank of receivers 28 and/or other optical communication paths.

Amplifiers 18, 22, and 24 could each comprise, for example, a rare earth doped amplifier such as an erbium doped or thulium doped amplifier, a Raman amplifier, a semiconductor amplifier, or a hybrid or combination of these or other amplifier types.

At least one amplifier in system 10 comprises a control system having a plurality of control legs each operable to process a portion of the optical signal at the input and/or the output of the amplifier. Each control leg has a smaller dynamic range than the total dynamic range the amplifier being controlled, however, each leg contributes to the total dynamic range of that amplifier, resulting in an amplifier with an overall wide dynamic range of control. In many embodiments, the amplifier being controlled has a total dynamic range greater than 25 decibels. In some embodiments, the controlled amplifier may have a dynamic range of greater than 35 or 40 decibels.

Figure 2:
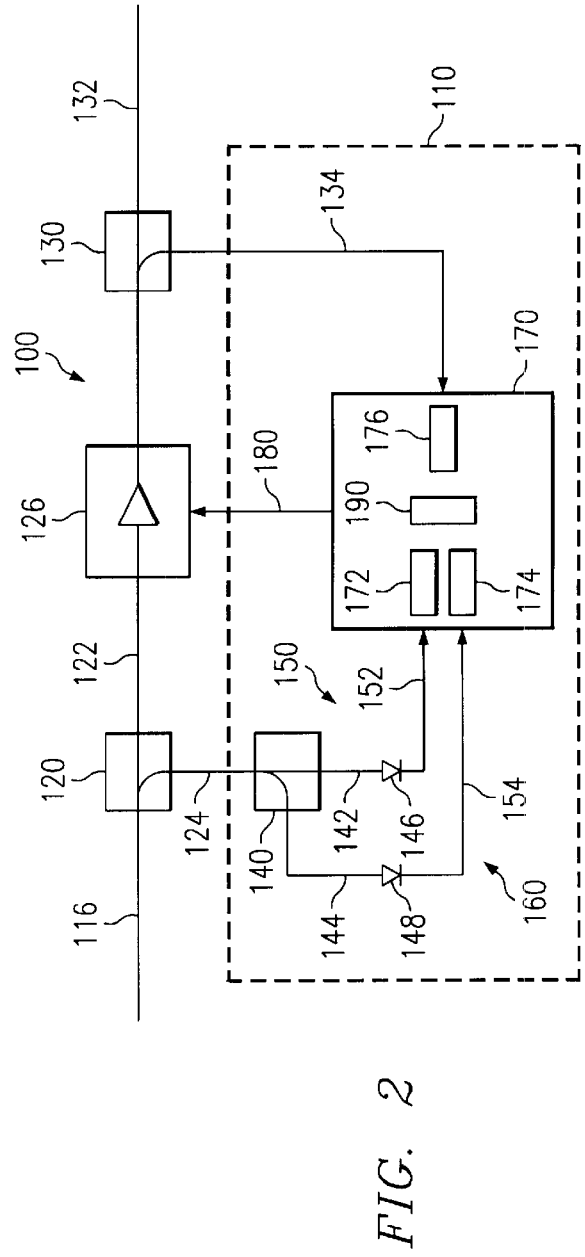
FIG. 2 is a block diagram of one particular example of an amplifier utilizing a control system to increase the dynamic range of amplifier control according to the teachings of the present invention.

FIG. 2 is a block diagram of one particular example of an amplifier 100 utilizing a control system 110 to increase the dynamic range of amplifier control. In this example, amplifier 100 receives an optical signal 116 carrying one or more wavelength signals. Amplifier 100 includes an optical tap 120 operable to communicate a primary portion 122 of optical signal 116 toward a gain medium 126 for amplification, and to communicate a secondary portion 124 toward control system 110 for processing.

Primary portion 122 is selected to carry a larger percentage of signal 116 than secondary portion 124 carries. The larger the percentage of signal 116 carried by primary portion 122, the lower the losses in system 100. Secondary portion 124 should, however, be selected to comprise a large enough percentage of signal 116 to facilitate effective signal processing. As one non-limiting example, primary portion 122 could be selected to comprise, for example, approximately 98 percent of signal 116, while secondary portion 124 is selected to comprise approximately 2 percent of signal 116. Other ratios could be used without departing from the scope and spirit of the invention.

Gain medium 126 facilitates amplification of primary portion 122 of optical signal 116. Gain medium 126 could comprise part of a discrete Raman fiber amplifier, a distributed Raman amplifier, a rare-earth doped amplifier, a semiconductor amplifier, or other optical amplifier or combination of amplifier types.

Amplifier 100 also includes an optical tap 130 operable to receive an amplified version of signal 116, to communicate a primary portion 132 of amplified signal 116 on to another component in the network, and to communicate a secondary portion 134 of amplified signal 116 to control system 110 for processing. In this example, the tap ratio of optical tap 130 at the output of amplifier 100 is selected to match the tap ratio used in tap 120. Although this provides for a more symmetric design, it is not necessary that the tap ratios of taps 120 and 130 match one another.

In the illustrated embodiment, control system 110 of amplifier 100 includes an optical tap 140 operable to receive secondary portion 124 of signal 116 and to separate secondary portion 124 into a first control portion 142 and a second control portion 144. First control portion 142 is communicated over a first leg 150 of control system 110, while second control portion 144 is communicated over a second leg 160 of control system 100. Although this example shows the use of two control legs 150 and 160 in control system 110, additional optical taps could be implemented to form additional control legs, each receiving a portion of secondary signal portion 124. For ease of description only, the present example illustrates a system using only two control legs.

In this example, first control portion 142 is selected to carry a larger percentage of secondary signal portion 124 than second control portion 144 carries. As one example, first control portion 142 could carry 98 percent of secondary signal portion 124, while second control portion 144 carries the remaining 2 percent of secondary signal portion 124. Other tap ratios could be used without departing from the scope of the invention.

Control system 110 further includes optical-to-electrical converters 146 and 148, each operable to convert optical control portions 142 and 144, respectively, to an electrical signal 152 and 154, respectively. A photodiode is one example of a device that could be used as an optical-to-electrical converter.

Control system 110 includes a controller 170 operable to receive one or more signals (e.g., 152 and 154) proportional to the power of optical signal 116 at the input side of amplifier 100 and one or more signals (e.g., 134) proportional to the power of amplified signal 116 at the output side of amplifier 100. Controller 170 facilitates generation of a control signal 180, which operates to vary one or more characteristics of amplifier 100 based at least in part on one or more signals measured by control system 110. For example, control signal 180 may affect the gain of amplifier 100. This could be accomplished, for example, by using control signal 180 to adjust a pump power feeding gain medium 126 where amplifier 100 comprises a rare earth doped amplifier or a Raman amplifier, or by using control signal 180 to adjust a current feeding gain medium 126 where amplifier 100 comprises a semiconductor amplifier. Controller 170 may comprise any hardware, firmware, software, or combination thereof.

Each control leg 150 and 160 is associated with a register, 172 and 174, respectively, which resides within or is accessible to controller 170. Throughout this document, the term "register" denotes any arrangement, compilation, device, circuitry, data structure, or other storage medium or combination of storage media operable to facilitate storage and retrieval of information. Where control signal portions 152 and 154 comprise digital signals, registers 172 and 174 could comprise, for example, any memory medium operable to store digital information. Registers 172 and 174 could each comprise separate memory structures, or could comprise logically partitioned areas of a common memory structure. Where control signal portions 152 and 154 comprise analog signals, registers 172 and 174 could comprise, for example, circuitry, such as a delay loop, operable to store analog values.

The capacity of each register 172 and 174 to store information typically depends at least in part on the size and complexity of the register's design. Often, the larger the memory, whether digital or analog, the more complex and expensive its design. In addition, as the number of bits stored or the complexity of the storage circuitry increases, the linearity and speed of the control circuitry can deteriorate, particularly in systems using analog-to-digital converters processing large numbers of bits.

One aspect of the present invention recognizes that the dynamic range of an amplifier's control mechanism can be increased by partitioning the signal being observed into a plurality of portions. Each portion can be processed in a separate control leg using relatively simple and inexpensive components to deliver a modest dynamic range for that control leg. The dynamic ranges associated with each control leg can cooperate to result in a wide overall dynamic range for the amplifier.

To facilitate this operation, each of registers 172 and 174 can be designed to store a limited amount of information describing a particular range of operation. Through, for example, appropriate selection of tap ratios each register can be assigned a particular range of values. Knowing the range of values assigned to each register allows for scaling of the measured values stored in the registers to at least approximate an actual power value associated with signal 116.

Signal portions carrying relatively higher percentages of optical signal 116 can be used to measure lower power signals, while signal portions carrying relatively lower percentages of optical signal 116 can be used to measure higher power signals. As a particular example, register 172 associated with first control leg 150 could be configured to store values associated with signal powers between −40 and −20 decibels referenced to one milli-watt (dBm). Register 174 associated with second control leg 160 could be configured to store values associated with signal powers between −20 and zero dBm.

Registers associated with higher percentage signal portions will be used to record lower power signals, while registers associated with signals carrying lower percentages of signal 116 will be used to record higher power signals. Because each register is configured to store only a limited range of values, higher power signals will tend to overflow registers associated with signal portions carrying higher percentages of signal 116, while lower power signals will tend to underflow registers associated with signal portions carrying lower percentages of signal 116.

Controller 170 can operate to select a register that is not overflowed or underflowed to obtain a measured value of signal power level for processing. The measured value can be scaled to an actual value by, for example, applying a scaling factor associated with that register. The scaling factor can relate to, for example, the tap ratios used in control circuitry 110. By using a combination of a plurality of control legs each yielding a modest dynamic range, the overall dynamic range of amplifier 100 can be increased. In addition, this approach allows for use of relatively simple and inexpensive components, including registers and analog-to-digital converters utilizing a relatively small number of bits, which reduces component costs and maintains good system speed and accuracy.

In operation, amplifier 100 receives optical signal 116 at input optical tap 120, which separates signal 116 into primary portion 122 and secondary portion 124. Amplifier loo communicates primary portion 122 toward gain medium 126 for amplification according to a present gain setting of the amplifier. Amplifier 100 communicates secondary portion toward control system 110. In this example, primary signal portion 122 comprises approximately 98 percent of signal 116, while secondary portion 124 comprises approximately 2 percent of signal 116.

Optical tap 140 further divides secondary signal portion 124 into first control portion 142 and second control portion 126. In this example, first control portion comprises approximately 98 percent of secondary signal portion 124, while second control portion 144 comprises approximately 2 percent of secondary signal portion 124. Amplifier 100 communicates first control portion 142 along first leg 150, where optical-to-electrical converter 146 converts first control portion 142 to electrical signal 152. Electrical signal 152, or a value representing electrical signal 152 is stored in register 172. Similarly, amplifier 100 communicates second control portion 144 along second leg 160, where optical-to-electrical converter 148 converts second control portion 144 to electrical signal 154. Electrical signal 154, or a value representing electrical signal 154 is stored in register 174.

Each register comprises a particular capacity. For ease of description, this example will be described assuming a digital value is to be stored in each register 172, 174. Analog circuitry could, however, alternatively be used.

Because each register stores a limited number of bits, for example eight bits, each register 172 and 174 will either overflow, underflow, or contain a measured value representing the power of the signal received. In this particular example, registers 172 and 174 are configured so that there is no overlap between registers. That is, for a given signal power, one of registers 172 and 174 will contain a measured value, while the other will overflow or underflow. Some amount of overlap could alternatively be used.

When a relatively low power signal 116 is received by amplifier 100, register 172 associated with first control signal 152 having a relatively higher percentage of signal 116 will store a measured value, while register 174 associated with second control signal 154 carrying a relatively lower percentage of signal 116 will underflow. Conversely, when a relatively high power signal 116 is received by amplifier 100, register 172 associated with first control signal 152 having a relatively higher percentage of signal 116 will overflow, while register 174 associated with second control signal 154 carrying a relatively lower percentage of signal 116 will store a measured value.

Controller 170 interprets the magnitude of the measured values differently depending on which register stores that value. For example, controller 170 can apply different scaling factors to values stored in different registers. Controller 170 can then compare the measured value (accounting for any necessary scaling factors depending on the register storing that value) to a measured value of signal 116 at the output of amplifier 100 to ascertain a measured gain value for the amplifier. Controller 170 can generate control signal 180 to correct any deviation of the measured gain value from a target gain value.

Although this example depicts use of a plurality of partitioned signals and associated registers at the input side of the amplifier, this type of arrangement could likewise, or in the alternative, be used in measuring signal 116 at the output side of the amplifier. In addition, although this example discusses using just two partitioned control legs, any number of additional control legs could be used to further enhance the dynamic range of control system 110.

Figure 3:
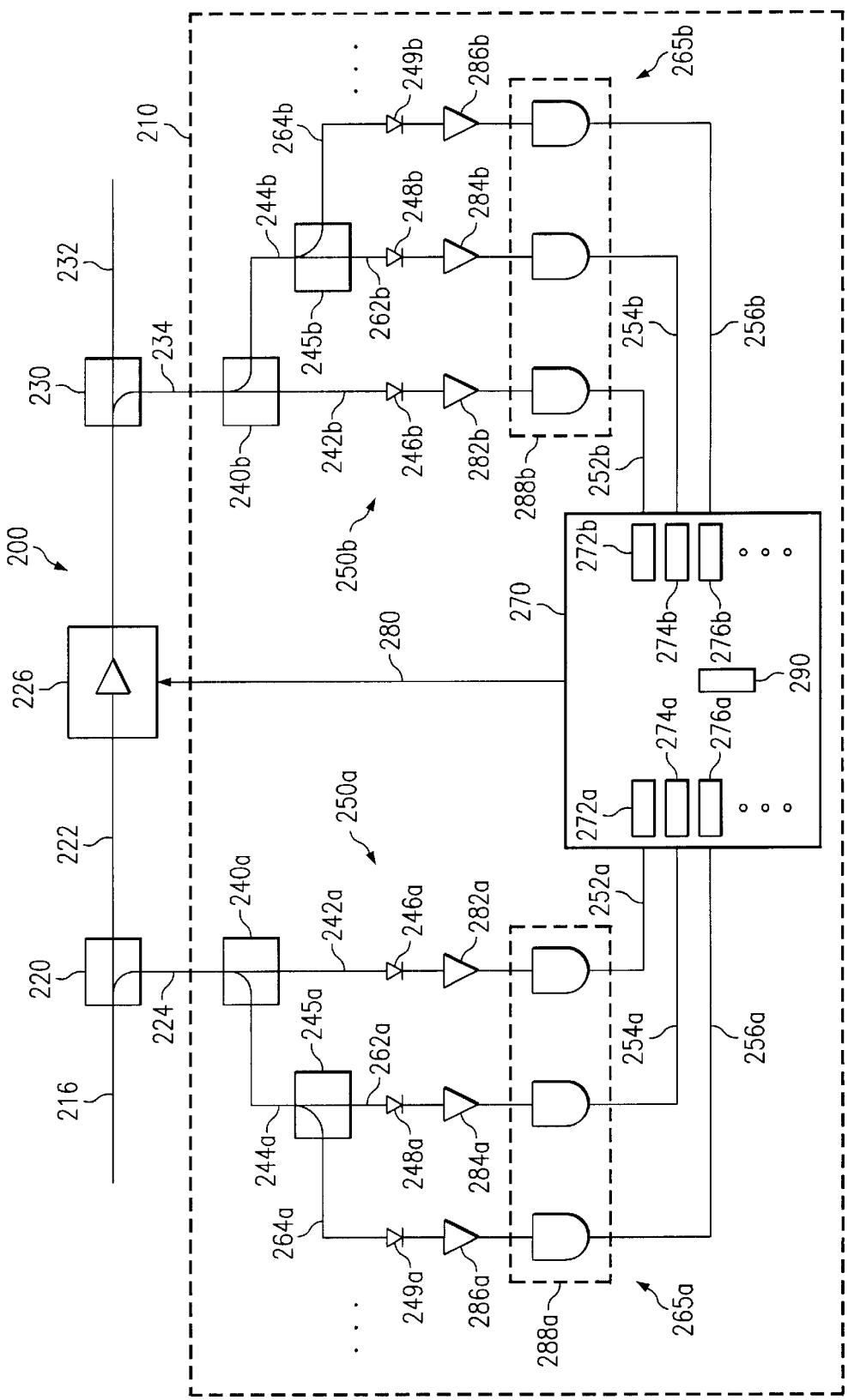
FIG. 3 is a block diagram showing another example embodiment of an amplifier utilizing a control system to increase the dynamic range of amplifier control according to the teachings of the present invention.

FIG. 3 is a block diagram showing another example embodiment of an amplifier 200 utilizing a control system 210 to increase the dynamic range of amplifier control. Amplifier 200 is similar in structure and function to amplifier 100 shown and described with respect to FIG. 2, except amplifier 200 utilizes three control legs 250, 260, and 265 at both the input side of the amplifier and the output side of the amplifier. In this example, control circuitry 210 at the input side of amplifier 100 is identical to the control circuitry 210 at the output side of amplifier 200. For ease of description, this discussion will focus on the input side of amplifier 200. The discussion applies likewise to control circuitry 210 at the output side of amplifier 200. In addition, although both the input and the output sides of control circuitry 210 comprise the same number of control legs, different numbers of control legs could be used in the input and the output sides of control circuitry 210.

Amplifier 200 receives optical signal 216 at optical tap 220 where signal 216 is separated into a primary portion 222 and a secondary portion 224. Primary signal portion 222 is communicated toward a gain medium 226 for amplification. Secondary portion 224 is communicated toward control circuitry 210 for processing.

Fused fiber devices and partially transmitting surfaces are just two examples of devices that could serve as optical tap 220. Gain medium 226 could comprise a portion of a discrete Raman fiber amplifier, a distributed Raman amplifier, a rare-earth doped amplifier, a semiconductor amplifier or a combination of these or other amplifier types.

Control circuitry 210 includes an optical tap 240 operable to separate secondary signal portion 224 into a first control portion 242 and a second control portion 244. In this example, first control portion 242 comprises approximately 98 percent of secondary signal portion 224, while second control portion 244 comprises approximately 2 percent of secondary signal portion 224.

Control circuitry 210 further comprises a second optical tap 245 operable to separate second control portion 244 into a third control portion 262 and a fourth control portion 264. In this example, third control portion 262 comprises approximately 98 percent of second control portion 244, while fourth control portion 264 comprises approximately 2 percent of second control portion 244. Tap ratios described with respect to optical taps 220, 240, and 245 are given for illustrative purposes only. Other tap ratios could be used without departing from the scope of the invention.

Control circuitry 210 also includes optical-to-electric converters 246, 248, and 249, each operable to convert control portions 242, 262, and 264, respectively, to electrical signals. In the illustrated embodiment, control circuitry 210 also includes transimpedance amplifiers 282, 284, and 286, each operable to receive and amplify electrical signals received from converters 246, 248, and 249, respectively. Amplification levels associated with transimpedance amplifiers 282–286 can be selected so that signals exiting those amplifiers share a common scale, despite the varying tap ratios encountered by those signals earlier in the circuit.

In this example, control circuitry 210 includes analog-to-digital converter (ADC) 288, which is operable to convert analog electrical signals received from transimpedance amplifiers 282–286 into digital signals 252–256, respectively. Analog-to-digital converter 288 may comprise a single ADC, or may comprise a plurality of ADCs, each operable to process electronic signals in one control leg 250, 260, and 265 of control circuitry 210.

Control circuitry 210 includes a controller 270. Controller 270 includes or has access to a plurality of registers 272, 274, and 276. This example assumes use of digitally stored signals, although an analog version of system 210 could equally apply. In this example, each register 272–276 is associated with one of control legs 250, 260, and 265, respectively. Each register 272–276 stores a particular number of bits and can be associated with a particular range of values. For example, each register can be associated with a separate control leg carrying a different percentage of signal 116 than other control legs.

In the illustrated embodiment, first leg 250 of control circuitry 210 receives first control portion 242, which carries the highest percentage of signal 216. Second control leg 260 carries second control portion 262, which comprises the next highest percentage of signal 216. Third control leg 265 carries third control portion 264, which carries the smallest percentage of signal 216. Through, for example, appropriate selection of tap ratios, each register 272–276 associated with one of control legs 250–265 can facilitate storing a particular range of values proportional to the actual power of signal 116. Registers associated with higher percentage signal portions will be used to record measurements where signal 116 is at a lower power level, while registers associated with signals carrying lower percentages of signal 116 will be used to record measurements where signal 116 is at a higher power level.

Because, in this example, each register is configured to store only a limited range of values, higher power signals will tend to overflow registers associated with signal portions carrying higher percentages of signal 116, while lower power signals will tend to underflow registers associated with signal portions carrying lower percentages of signal 116. By knowing a scaling factor associated with each register, which can be determined, for example, by knowing the tap ratios in amplifier 200, a plurality of simple inexpensive registers can be used to store a wide range of potential values. This also facilitates use of analog-to-digital converts using relatively low numbers of bits, increasing the speed and accuracy of the system.

In this particular example, registers 272–276 are each configured so that there is no overlap between values stored in the registers. That is, for a given signal power, only one of registers 272, 274, and 276 will contain an actual value, while the other registers will either overflow or underflow. Alternatively, registers 272–276 could be designed to provide some amount of overlap between values of signals that can be stored.

In operation, amplifier 200 receives signal 216 at optical tap 220 and separates signal 216 into primary portion 222 to be amplified and secondary portion 224 to be processed by control system 210. Control system 210 separates secondary signal portion 224 into first control portion 242 and second control portion 244. Control system 210 then separates second control portion 244 into a third control portion 262 and a fourth control portion 264. First control portion 242 carries the highest percentage of optical signal 216 while fourth control portion 264 carries the lowest percentage of optical signal 216.

Control system 210 converts first control portion 242, third control portion 262, and fourth control portion 264 into electronic signals. Control system 210 amplifies those electronic signals to return the signals to a common baseline magnitude, and converts the analog electronic signals to digital signals 252–256, respectively. Analog-to-digital converter 288 outputs a digital representation of a voltage for each electronic signal received. Registers 272–276 store the digital values.

In this example, a similar process occurs at the output side of amplifier 200, where optical tap 230 separates an amplified version of optical signal 216 into a primary portion 232 and a secondary portion 234. Secondary portion 234 of the amplified version of signal 216 is separated into first, second, third, and fourth control portions, each containing a smaller percentage of amplified signal 216 than the last. Digital representations 252b–256b of first, third and fourth control portions are stored in registers 272b–276b, respectively.

Control engine 290 of controller 270 identifies registers that have not overflowed or underflowed and which contain a measured value of signal power. After performing any necessary scaling to account for signal differences due to tap ratios, control engine 290 compares the measured value of the input signal power to the measured valued of the output signal power. Based on this comparison, control engine 290 generates a control signal 280, which may modify the gain of amplifier 200.

This example depicts an embodiment utilizing partitioned control circuitry at the input side as well as the output side of the amplifier. In this manner, control system 210 can achieve high dynamic range at the input and the output while utilizing simple, inexpensive components including analog-to-digital converters and registers utilizing a relatively low number of bits. This helps minimize system cost and helps to maintain good system speed and accuracy.

Figure 4:
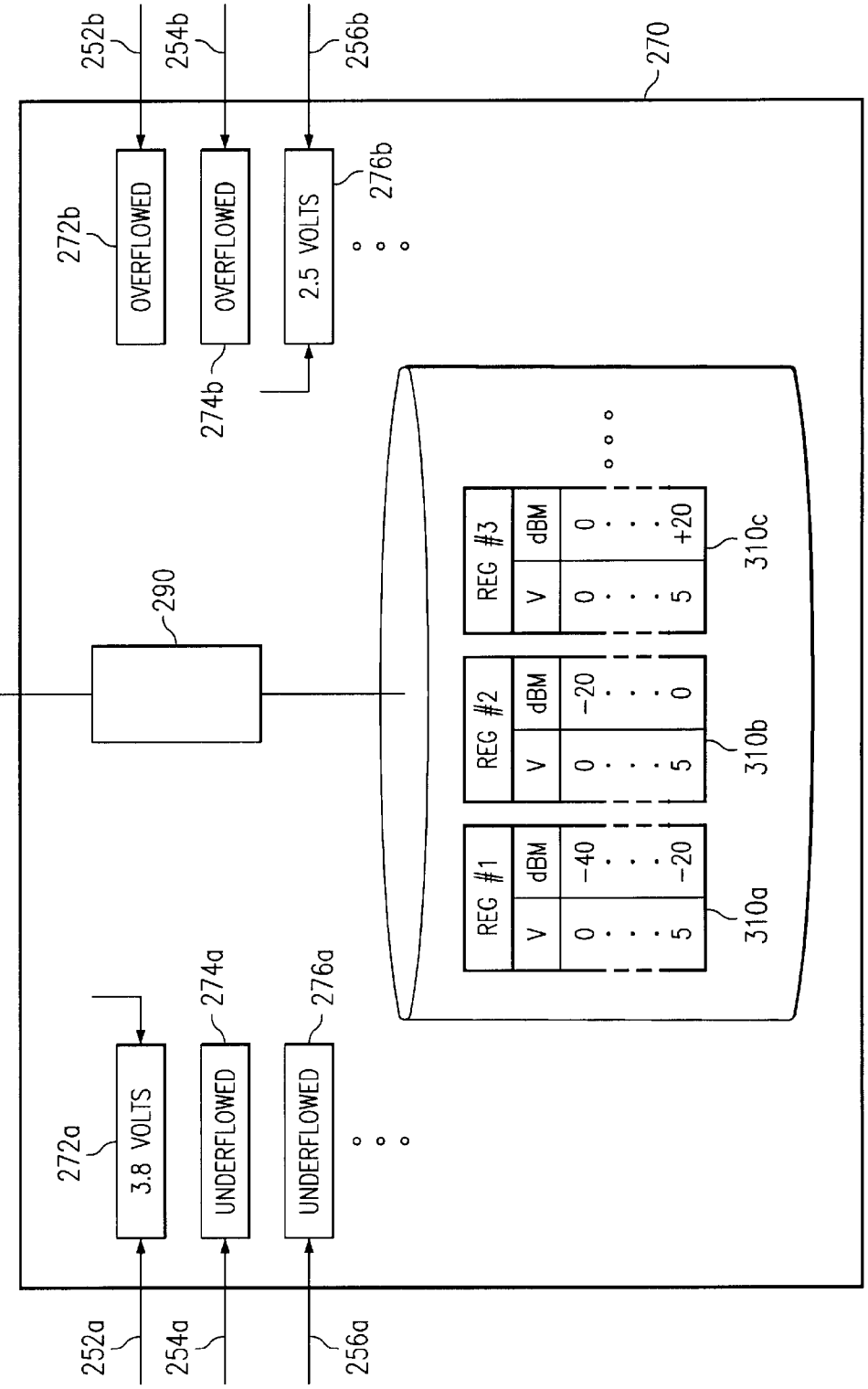
FIG. 4 is a block diagram showing one particular example of a controller constructed according to the teachings of the present invention.

FIG. 4 is a block diagram showing one particular example of a controller 270. In this example, controller 270 includes a plurality of input registers 272a–276a, and a plurality of output registers 272b–276b. Input registers 272a–276a store digital representations 252a–256a, respectively, of first control portion 242a, third control portion 262a, and fourth control portion 264a, respectively. Likewise, output registers 272b–276b store digital representations 252b–256b, respectively, of first control portion 242b, third control portion 262b, and fourth control 264b, respectively.

Each register 272–276 is associated with a control leg 250, 260, or 265, respectively. Controller 270 leverages knowledge of the ratios of signals measured in each control leg to use each control leg to measure a particular range of magnitudes of signal 216. First control leg 250, which carries the highest percentage of signal 216, is best suited to measure signal 216 at its lowest power levels. Conversely, third control leg 265, which carries the lowest percentage of signal 216, is best suited to measure signal 216 at its highest power levels.

In the illustrated embodiment, each register 272–276 stores the same number of bits. As a particular example, each register 272–276 may store eight bits. If the magnitudes of values 252–256 are out of the range of registers 272–276, those registers will underflow or overflow, depending on the value of the associated signal. If any of digital values 252–256 are within the range of registers 272–276, the value of that signal will be stored in its associated register.

Using the knowledge of the percentage of signal 216 in each control leg, controller 270 can apply a scaling factor to measured values stored in registers 272–276, which varies according to which register holds the measured value. If there is a linear relationship between the power of signal 216 and the measurement (typically expressed in volts) stored in the applicable register, controller 270 may simply apply a scaling factor associated with that register to the measured value to obtain the actual power of signal 116. Alternatively, controller 270 may apply to the measured value an equation describing the relationship between the measured value and the actual power of signal 216. In still another embodiment, controller 270 may include a plurality of look-up tables, each associated with one of registers 272–276. One example of that embodiment is further described below.

In this particular example, controller 270 includes a plurality of look-up tables 310a–310c. Each look-up table 310 is associated with one of registers 272–276. Look-up table 310 facilitate cross-referencing voltage values stored in associated registers 272–276 with a power value measured in decibels above one milli-watt (dBm).

In this example, each register 272–276 facilitates measuring signals in a dynamic range of approximately 20 dBm. The lowest power signal 216, in this case ranging in power from −40 dBm to −20 dBm, are measured in first control legs 250 and are stored in first registers 272, which are associated with first control legs 250 carrying the highest percentage of signal 216. Signals 216 having intermediate power, in this example between −20 dBm and 0 dBm, are measured in second control legs 260 and are stored in second registers 274. Power values associated with the highest power signals 216, in this case ranging from 0 dBm to 20 dBm, are measured in third control legs 265 carrying the lowest percentage of signal 216 and are stored in third registers 276.

Using this or a similar configuration, controller 270 facilitates measuring signals over a wide dynamic range by using a plurality of partitioned signal ranges, each having a smaller dynamic range than the amplifier's total dynamic range. At the same time, this configuration allows use of analog-to-digital converters and registers utilizing a relatively small number of bits, which minimizes system cost and maintains system speed and accuracy.

As a particular example of operation, amplifier 200 receives unamplified optical signal 216 having a power of approximately −25 dBm. Optical tap 220 separates signal 216 into primary portion 222 and secondary portion 224. Optical taps 240a and 245a separate secondary signal portion 224 into first, second, third and fourth control portions, each having only a percentage of optical signal 216 carried by the previous one. Photo diodes 246–249, transimpedance amplifiers 282–286, and analog-to-digital converter 288 collectively convert optical control portions 242, 262, and 264 to digital representations 252–256. In this example, only first control portion 242, which carries the highest percentage of signal 216, registers a value capable of being stored in registers 272–276. In this case, the value stored in first register 272a is 3.8 volts. Registers 274a and 276a underflow, in this example, because the voltages associated with third control portion 262 and fourth control portion 264, which represent very small percentages of secondary signal portion 224, are small enough to underflow registers 274–276.

On the output side of amplifier 200, optical tap 230 separates the amplified version of signal 216 into primary portion 232 and secondary portion 234. Control circuitry 210 further separates secondary signal portion 234 into first control portion 242b, second control portion 244b, third control portion 262b and fourth control portion 264b.

In this example, the amplified version of signal 216 comprises a power of approximately 10 dBm. This relatively higher powered signal results in digital representations 252b–256b, which overflow registers 272b and 274b. Register 276b, which is associated with fourth control portion 264b, carrying only 0.04 percent of secondary signal portion 234, facilitates storage of the actual voltage measurement 256b.

Control engine 290 observes registers 252a–256a to identify a register that has neither underflowed nor overflowed. Similarly, control engine 290 observes output registers 272b–276b to identify a register that has neither overflowed nor underflowed. In this example, control engine 290 identifies first input register 272a and third output register 276b as storing measured values. Control engine 290 retrieves information from the identified registers, cross-references the voltage measurements obtained from those registers with look-up tables 310, and identifies an actual measured gain of amplifier 200.

In this case, cross-referencing 3.8 volts obtained from first input register 272a with look-up table 310a, control engine 290 identifies the input signal power as approximately −25 dBm. Cross-referencing the value of 2.5 volts obtained from third output register 276b with look-up table 310c associated with that register, control engine 290 determines that the output power of signal 216 is approximately 10 dBm. Comparing the input power with the output power shows a measured amplifier gain of approximately 35 dBm. Control engine 290 compares the measured amplifier gain with a target amplifier gain and generates control signal 280 operable to adjust the gain of amplifier 200 to more closely match the target amplifier gain.

Figure 5:
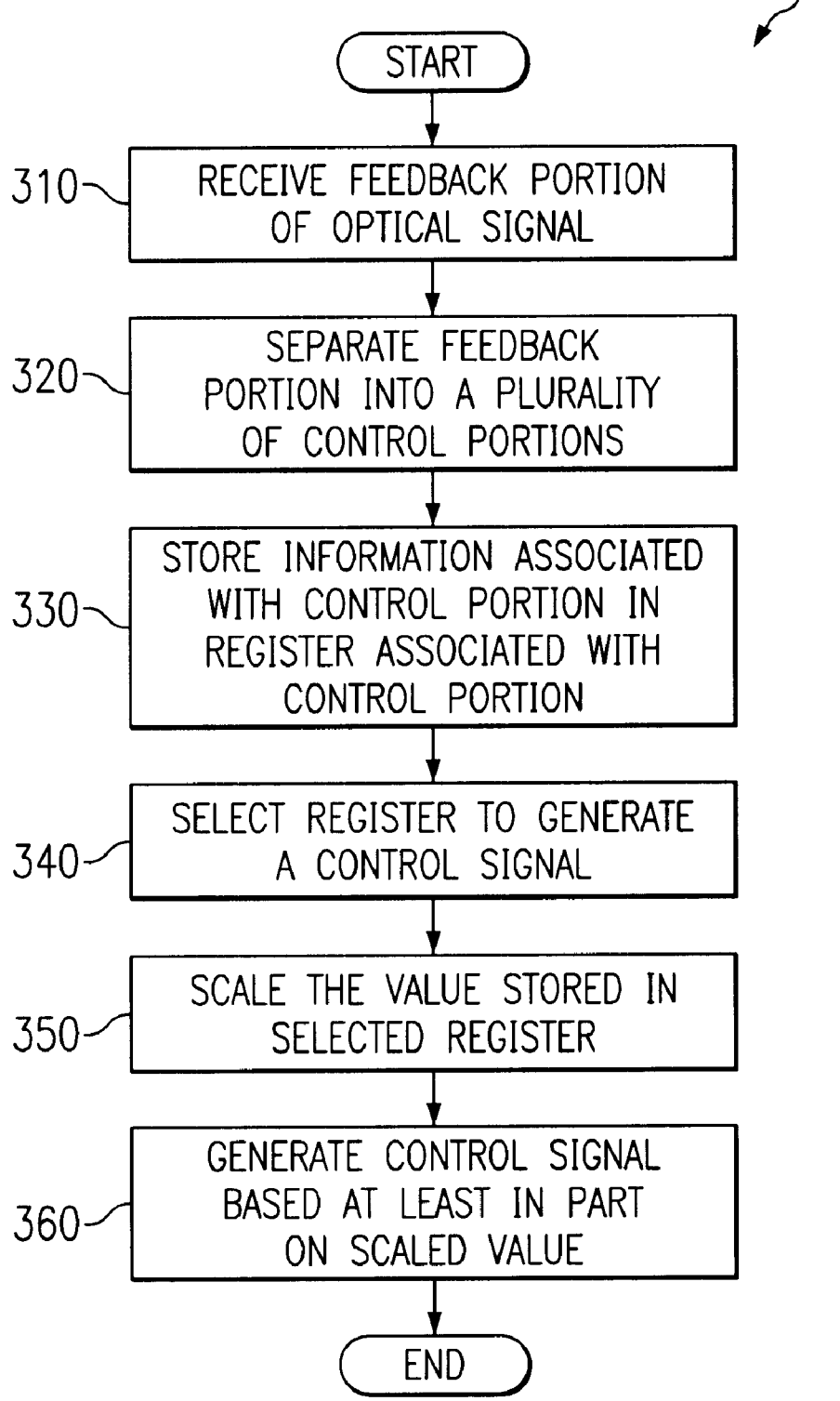
FIG. 5 is a flow chart illustrating one example of a method of controlling an amplifier according to the teachings of the present invention.

FIG. 5 is a flow chart showing one example of snapshot of steps in a method 300 of controlling an optical amplifier. Although method 300 will be described with reference to amplifier 200 shown in FIG. 5, methods corresponding other amplifier embodiments could also be used without departing from the scope of the invention.

Method 300 begins at step 310 where control circuitry 210 of amplifier 300 receives feedback portion 224 of optical signal 216. In this example, feedback portion 224 is received from optical tap 220. Optical tap 220 comprises a device operable to separate optical signal 216 into primary portion 222 and feedback portion 224. In this example, feedback portion 224 comprises a smaller percentage of optical signal 216 than does primary portion 222. For example, feedback portion 224 may comprise approximately 2 percent of optical signal 216.

Amplifier 200 can continue to accept additional feedback portions of the optical signals as it processes previously received feedback portions. In some embodiments, amplifier 200 can continuously accept additional feedback portions as they are created. In other cases, amplifier 200 can periodically, or on a random basis accept additional feedback portions.

Control system 210 separates feedback portion 224 into a plurality of control portions 242 and 244 at step 320. This step may involve, for example, an optical tap 240 separating feedback portion 224 into first control portion 242 and second control portion 244, which comprises a smaller portion of feedback signal 224 than does first control portion 242. In this particular example, separating the feedback portion 224 into a plurality of control portions further comprises separating second control portion 244 into a third control portion 262 and a fourth control portion 264. In this example, fourth control portion 264 carries the smallest percentage of optical signal 216, while first control portion 242 carries the largest percentage of optical signal 216.

Control system 210 stores information associated with the control portions in registers associated with each control portion at step 330. In preparation for storing this information, control system 210, in this example, converts optical control portions 242, 262, and 264 to electrical signals using optical-to-electrical converters 246, 248, and 249, respectively. Electrical signals output from converters 246, 248, and 249, in this example, are then passed to transimpedance amplifiers 282–286. Transimpedance amplifiers 282–286 scale the electrical signals received from converters 246–249 so that each electrical signal has a common basis and magnitude. For example, transimpedance amplifiers 282–286 can be selected to provide various levels of amplification so that each electrical signal output from transimpedance amplifiers 282–286 comprises a signal ranging between zero and five volts.

In this example, the information stored in registers 272–276 comprises digital information formed, for example, by passing an electrical signals from transimpedance amplifiers 282–286 into analog-to-digital converters 288. Digital signals emerging from analog-to-digital converters 288 are stored in registers 272–276. Each register 272–276 is associated with one of control legs 250–265, respectively.

Controller 270 selects one or more registers to generate a control signal at step 340. Controller 270 may select an applicable register, for example, by identifying a register that does not store an underflowed or overflowed value. Controller 270 may identify an applicable input register 272a–276a and an applicable output register 272b–276b.

Controller 270 scales the value stored in the selected registers at step 350. This may comprise, for example, applying a scaling factor associated with the register storing the selected value. A few examples of methods that can be used to scale the value stored to the selected register are applying a scaling multiple to the value, applying an equation to the value, or using the value as an index to a look-up table storing scaled values.

Control system 210 generates control signal 180 based at least in part on the scaled value at step 360. For example, the scaled values may comprise an approximation of the input power of signal 216 and an approximation of the output power of signal 216. Controller 210 may compare the scaled or approximate value of input power to the scaled or approximate value of output power to determine a measured gain value of amplifier 200. Controller 210 may compare the measured gain value to a target gain value, and generate control signal 280 to steer the gain of amplifier 200 toward the target gain value.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A control system for use in an optical amplifier, the control system comprising:
   a plurality of control legs, each operable to receive one of plurality of portions of an optical signal, wherein each of the plurality of portions comprises a different percentage of the optical signal;
   a plurality of registers, each associated with one of the control legs and each operable to store a value proportional to the portion of the optical signal communicated in the associated control leg; and
   a controller operable to select one of the values stored in one of the plurality of registers and to scale that value by a scaling factor to generate a scaled value, wherein the scaling factor is determined at least in part by the percentage of the optical signal associated with that value;
   wherein the controller is operable to generate, based at least in part on the scaled value, a control signal operable to affect the gain of the amplifier.

2. The system of claim 1, wherein the optical signal comprises an input signal to the amplifier.

3. The system of claim 1, wherein the optical signal comprises an output signal from the amplifier.

4. The system of claim 1, wherein each of the plurality of registers comprises a medium operable to store digital information.

5. The system of claim 4, wherein each of the plurality of registers comprises a portion of a single memory structure.

6. The system of claim 4, wherein each of the plurality of registers comprises a separate memory structure.

7. The system of claim 1, wherein each of the plurality of registers comprises circuitry operable to store analog information.

8. The system of claim 1, wherein the amplifier comprises a rare-earth doped amplifier or a Raman amplifier and wherein the control signal comprises a signal operable to affect a pump power driving the amplifier.

9. The system of claim 1, wherein the amplifier comprises a semiconductor amplifier and wherein the control signal comprises a signal operable to affect a current driving the semiconductor amplifier.

10. The system of claim 1, wherein the controller comprises a pointer operable to read a current one of the plurality of registers, to return to the controller the value stored in that register if the current one of the plurality of registers is not overflowed or underflowed.

11. The system of claim 1, wherein each control leg comprises an optical-to-electrical converter, each converter operable to receive one of the portions of the optical signal and to convert the received portion into an electrical signal for processing.

12. The system of claim 11, wherein each control leg comprises a transimpedance amplifier operable to amplify the electrical signal received so that electrical signals in each of the plurality of control legs comprise a common basis of magnitude.

13. The system of claim 11, wherein each control leg comprises an analog-to-digital converter operable to receive one of the electrical signals and to generate a digital representation of the electrical signal received.

14. A control system for use in an optical amplifier, the control system comprising:
   a first optical tap operable to separate an optical signal into a primary portion comprising a first percentage of the optical signal, and a secondary portion comprising a second percentage smaller than the first percentage of the optical signal;
   a second optical tap operable to separate the secondary portion into a first control portion comprising a first percentage of the secondary portion and a second control portion comprising a second percentage smaller than the first percentage of the secondary portion;
   a plurality of registers each associated with one of the control portions and each operable to store a measured value proportional to a power of the optical signal if the measured value is between a maximum value and a minimum value associated with that register; and
   a controller operable to identify a register storing a measured value and to determine based at least in part on the measured value a control signal operable to affect the gain of the amplifier.

15. The system of claim 14, wherein the first or second optical tap comprises a device selected from the group consisting of a fused fiber device and a partially reflective mirror.

16. The system of claim 14, wherein the optical signal comprises an input signal to the amplifier and wherein the primary portion of the optical signal is passed to the amplifier for amplification.

17. The system of claim 14, wherein the optical signal comprises an output signal from an amplifier stage and wherein the primary portion of the optical signal comprises an optical signal passed from the amplifier stage to another network element or another amplifier stage.

18. The system of claim 14, wherein the primary portion of the optical signal comprises at least ninety percent of the optical signal and wherein the secondary portion of the optical signal comprises no more than ten percent of the optical signal.

19. The system of claim 14, wherein the first control portion comprises at least ninety percent of the secondary portion of the optical signal and wherein the second control portion comprises no more than ten percent of the secondary portion of the optical signal.

20. The system of claim 14, wherein each of the plurality of registers comprises a medium operable to store digital information.

21. The system of claim 14, wherein each of the plurality of registers comprises circuitry operable to store analog information.

22. The system of claim 14, wherein each of the plurality of registers comprises a portion of a single memory structure.

23. The system of claim 14, wherein each of the plurality of registers comprises a separate memory structure.

24. The system of claim 14, wherein the minimum value comprises a value sufficient to underflow the register associated with that value, and wherein the maximum value comprises a value sufficient to overflow the register associated with that value.

25. The system of claim 14, wherein the amplifier comprises a rare-earth doped amplifier or a Raman amplifier and wherein the control signal comprises a signal operable to affect a pump power driving the amplifier.

26. The system of claim 14, wherein the amplifier comprises a semiconductor amplifier and wherein the control signal comprises a signal operable to affect a current driving the semiconductor amplifier.

27. The system of claim 14, wherein the controller comprises a pointer operable to read a current one of the plurality of registers, to return to the controller the value stored in that register if the current register is not overflowed or underflowed.

28. The system of claim 14, further comprising a plurality of optical-to-electrical converters each operable to receive one of the control portions of the secondary portion of the optical signal and to convert the received optical signal into an electrical signal for processing.

29. The system of claim 28, further comprising a plurality of transimpedance amplifiers, each operable to amplify the electrical signal received so that electrical signals in each of the plurality of control legs comprise a common basis of magnitude.

30. The system of claim 28, further comprising a plurality of analog-to-digital converters, each operable to receive one of the electrical signals and to generate a digital representation of the electrical signal received.

31. The system of claim 14, further comprising a third optical tap operable to separate the second control portion into a third control portion comprising a first percentage and a fourth control portion comprising a second percentage smaller than the first percentage of the second control portion.

32. A control system for use in an optical amplifier, comprising:

an optical tap operable to receive a feedback portion of an optical signal being amplified, to communicate a first percentage of the feedback signal to a first control leg, and to communicate a second percentage of the feedback signal smaller than the first percentage of the feedback signal to a second control leg;

a first register operable to store a measured value of a portion of the optical signal obtained from the first control leg if the measured value does not overflow or underflow the first register;

a second register operable to store a measured value of a portion of the optical signal obtained from the second control leg if the measured value does not overflow or underflow the second register;

a controller operable to identify a register storing a measured value and to scale the measured value differently depending on which register stores the measured value, the controller further operable to generate based at least in part on the scaled measured value a control signal operable to affect the gain of the amplifier.

33. A method of operating an optical amplifier, comprising:

receiving a feedback portion of an optical signal;

separating the feedback portion into a plurality of control portions, each comprising a different percentage of the optical signal;

for each control portion, storing in a register associated with that control portion a value proportional to that control portion;

selecting a register to be used to generate a control signal;

scaling the value stored in the selected register based at least in part on the percentage of the optical signal associated with selected value; and generating the control signal based at least in part on the scaled value, the control signal operable to affect the gain of the amplifier.

34. The method of claim 33, wherein receiving a feedback portion of the optical signal comprises receiving the feedback portion from an optical tap operable to receive the optical signal and to separate the feedback portion from the optical signal.

35. The method of claim 33, wherein separating the feedback portion into a plurality of control portions comprises:

separating the feedback portion into a first control portion comprising a first percentage of the optical signal; and separating the feedback portion into a second control portion comprising a second percentage, smaller than the first percentage, of the optical signal.

36. The method of claim 33, further comprising converting each of the optical control portions to a corresponding electrical signal.

37. The method of claim 36, further comprising amplifying each corresponding electrical signal differently based at least in part on the percentage of the optical signal associated with that corresponding electrical signal.

38. The method of claim 36, further comprising converting each corresponding electrical signal to a digital value.

39. The method of claim 33, wherein each of the registers associated with a control portion comprises a medium operable to store digital information.

40. The method of claim 33, wherein each of the registers associated with a control portion comprises circuitry operable to store analog information.

41. The method of claim 33, wherein each register is associated with a distinct range of gain values.

42. The method of claim 33, wherein each register is operable to store values ranging from a minimum value to a maximum value, and wherein the each value stored is operable to be scaled to convert the stored value associated with a control portion to a value approximating the power of the optical signal.

43. The method of claim 33, wherein storing a value proportional to the control portion comprises storing a measured value if the measured value does not overflow or underflow the register.

44. The method of claim 43, wherein selecting a register comprises selecting a register that is neither underflowed nor overflowed.

45. The method of claim 33, wherein the optical signal comprises an input signal to an amplifier or an amplifier stage, and wherein generating the control signal comprises comparing the scaled value to a value associated with an output from the amplifier or amplifier stage.

46. The method of claim 33, wherein the optical signal comprises an output from an amplifier or an amplifier stage, and wherein generating the control signal comprises comparing the scaled value to a value associated with an input to the amplifier or amplifier stage.

47. The method of claim 33, further comprising:

separating the optical signal into a primary portion and a feedback portion;

communicating the primary portion to a gain medium for amplification; and communicating the feedback portion to a control system of the amplifier.

48. The method of claim 47, wherein the primary portion comprises at least ninety percent (90%) of the optical signal and wherein the feedback portion comprises less than ten percent (10%) of the optical signal.

49. The method of claim 33, further comprising:

receiving the optical signal from a gain medium;

separating the optical signal into a primary portion and a feedback portion;

communicating the primary portion to an additional amplifier stage or from the amplifier; and communicating the feedback portion to a control system of the amplifier.

50. An optical communication system operable to facilitate communication of multiple signal wavelengths, the system comprising:

one or more transmitters operable to generate alone or collectively a plurality of signal wavelengths;

a multiplexer operable to combine the plurality of signal wavelengths into a single multiple wavelength signal for transmission over a transmission medium; and a plurality of optical amplifiers operable to receive the plurality of signal wavelengths, at least one. of the optical amplifiers communicating with a control system, comprising:

a plurality of control legs, each operable to receive one of plurality of portions of an optical signal, wherein each of the plurality of portions comprises a different percentage of the optical signal;

a plurality of registers, each associated with one of the control legs and each operable to store a value proportional to the portion of the optical signal communicated in the associated control leg; and a controller operable to select one of the values stored in one of the plurality of registers and to scale that value by a scaling factor to generate a scaled value, wherein the scaling factor is determined at least in part by the percentage of the optical signal associated with that value;

wherein the controller is operable to generate, based at least in part on the scaled value, a control signal operable to affect the gain of the at least one of the optical amplifiers.

* * * * *

UNITED STATES PATENT AND TRADEMARK OFFICE
CERTIFICATE OF CORRECTION

PATENT NO. : 6,594,071 B1  Page 1 of 1
DATED : July 15, 2003
INVENTOR(S) : Pavle Gavrilovic et al.

It is certified that error appears in the above-identified patent and that said Letters Patent is hereby corrected as shown below:

<u>Title page,</u>
Item [75], Inventors, after "James E. Newby" insert -- , IV --.

Signed and Sealed this

Twenty-eighth Day of October, 2003

JAMES E. ROGAN
*Director of the United States Patent and Trademark Office*